April 8, 1958     B. W. VANDENBERG ET AL     2,829,871
MOLASSES MIXER FOR DRY CATTLE FEED
Filed Aug. 18, 1955
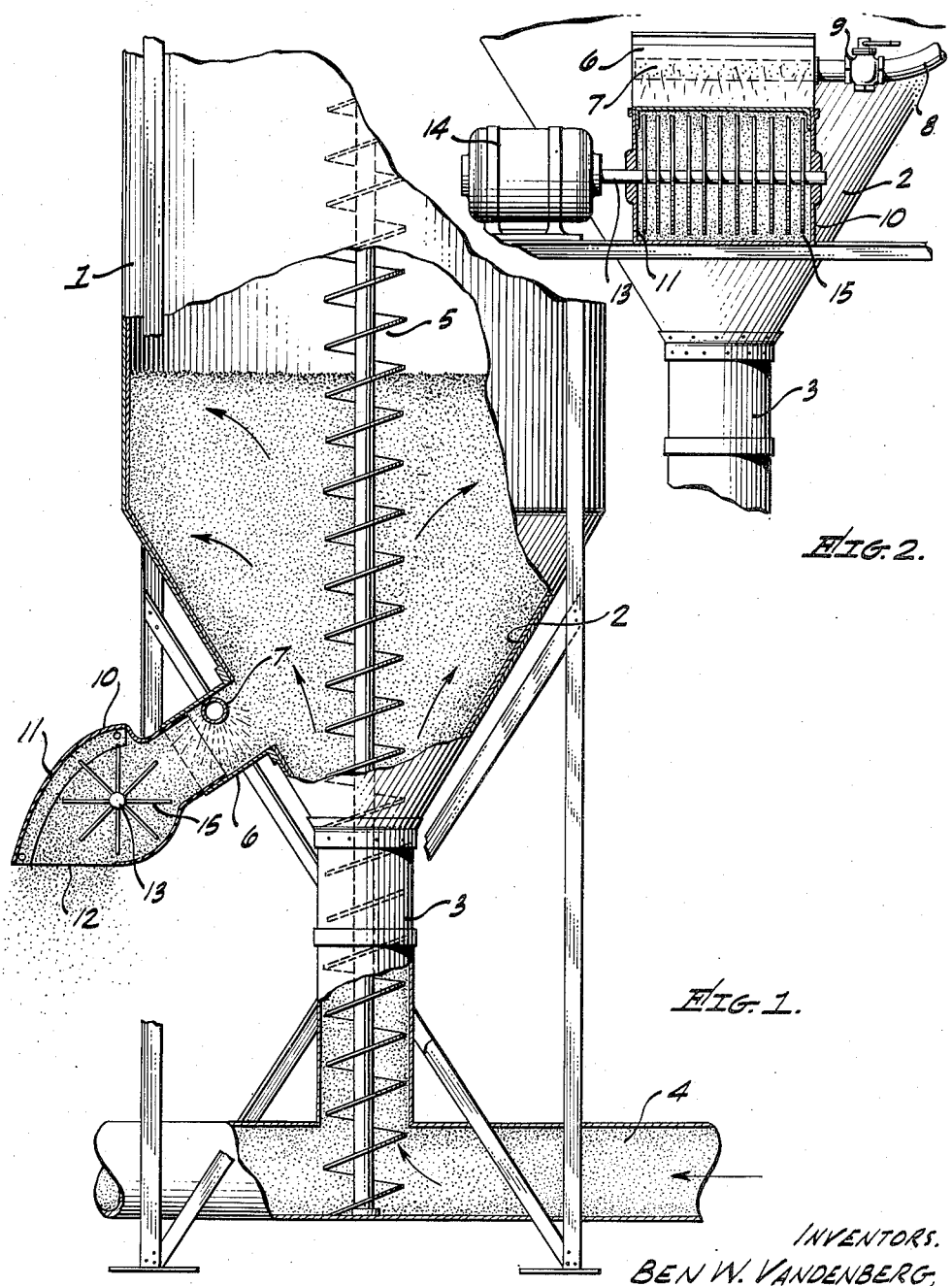
INVENTORS.
BEN W. VANDENBERG,
AUGUST VANDENBERG,
BY
ATTORNEY.

United States Patent Office 2,829,871
Patented Apr. 8, 1958

2,829,871

MOLASSES MIXER FOR DRY CATTLE FEED

Ben W. Vandenberg, Bellflower, and August Vandenberg, Artesia, Calif.

Application August 18, 1955, Serial No. 529,137

1 Claim. (Cl. 259—10)

This invention relates to a mixer whereby molasses is spread upon a dry cattle feed and thoroughly admixed therewith without creating large lumps in the feed.

An object of our invention is to provide a novel molasses mix for dry cattle feed in which the molasses is thoroughly spread throughout the mass of the dry feed, and the particles of feed are each thoroughly coated with the molasses and without creating lumps or hard particles in the feed.

Another object of our invention is to provide a molasses mixer of the character stated, in which the particles of dry feed are kept separated and in a substantially loose condition similar to the condition of the dry feed when not coated or admixed with molasses.

Still another object of our invention is to provide a novel molasses mixer of the character stated, which is attached to the usual storage bin for the cattle feed and which can be thus readily used when the feed is withdrawn from the bin during feeding time.

Still another object of our invention is to provide a novel molasses mixer of the character stated, which is simple in construction, inexpensive to manufacture, and effective in use.

Other objects, advantages and features of invention may appear from the accompanying drawing, the subjoined detailed description and the appended claim.

In the drawing:

Figure 1 is a side elevation of our molasses mixer for dry cattle feed as mounted on a storage bin, and with parts broken away to show interior construction.

Figure 2 is a fragmentary side elevation of our molasses mixer and showing the mixing chamber in section.

Referring more particularly to the drawing, the numeral 1 indicates the usual storage bin for cattle feed, and the lower portion 2 of which is conical in shape for the purpose of directing the feed towards the center of the bin. A pipe 3 extends into the bottom of the bin 1 and projects upwardly from a feed pipe 4 through which the dry feed is forced from a central storage tank, or the like. The dry feed is forced through the pipe 4 and is lifted into the pipe 3 and thence into the bin 1 by a helical conveyer 5. This conveyer is power driven from a suitable power source not shown. An outlet duct 6 projects from the conical portion 2 of the bin and feed is adapted to flow out of this duct by gravity. A perforated pipe 7 extends horizontally through the duct 6 and this perforated pipe will spray the molasses into the mass of feed which is flowing out through the duct 6. A hose 8, attached at one end to the perforated pipe 7, conducts the molasses under pressure from a storage tank, not shown. A valve 9 at the end of the perforated pipe 7 permits control of the molasses flowing into that pipe. A mixer 10 consists of a hood 11 which fits into the duct 6 and is fixedly attached to the duct by means of suitable screws, bolts, or the like. The hood 11 is formed with an outlet 12 through which the mixed feed pours. A shaft 13 extends horizontally through the hood 11 and this shaft is continuously rotated by an electric motor 14, or a similar type of rotating unit. Mixing fingers 15 are fixedly attached to the shaft 13 and extend radially from this shaft. The fingers 15 are positioned within the hood 11 and these fingers as they rotate will thoroughly mix the feed and molasses, and will also separate the small particles of the feed from each other so that they do not form large and hard lumps. The mixing fingers 15 are continuously rotated during the time that the molasses is fed into the stream of feed from the outlet duct 6. The mixed molasses and feed drops out of the opening 12 into an appropriate container and is then carried to the feed stalls, or may be stored for future feeding, if desired.

Having described our invention, we claim:

A molasses mixer for dry cattle feed, comprising a vertical storage bin, the lower end of said bin being conical, a duct projecting from the conical portion of the bin adjacent the bottom thereof and through which the cattle feed moves, a mixer fixedly mounted on said duct and at the outer end thereof, the feed passing through the mixer from said duct, said mixer including a hood, a horizontal shaft extending entirely through the hood and journaled therein, drive means connected to the shaft, a plurality of mixing fingers projecting from the shaft and arranged within the hood, said hood having an outlet in the bottom thereof through which the mixed feed passes, and a perforated pipe horizontally arranged and positioned in the outlet duct between the mixing fingers and the bin, said perforated pipe extending entirely through said outlet duct, said perforated pipe conveying molasses to the feed moving through the outlet duct.

References Cited in the file of this patent

UNITED STATES PATENTS

| | | |
|---|---|---|
| 2,164,257 | Riza | June 27, 1939 |
| 2,236,219 | Prater | Mar. 25, 1941 |
| 2,400,202 | Kelderhouse | May 14, 1946 |